United States Patent [19]

Cox

[11] Patent Number: 4,911,893
[45] Date of Patent: Mar. 27, 1990

[54] FLOATING RECYCLE PAN FOR EBULLATED BED REACTORS

[75] Inventor: Jeffry A. Cox, Warrenville, Ill.

[73] Assignee: Amoco Corporation, Chicago, Ill.

[21] Appl. No.: 212,777

[22] Filed: Jun. 29, 1988

Related U.S. Application Data

[62] Division of Ser. No. 61,533, Jun. 11, 1987, Pat. No. 4,792,391.

[51] Int. Cl.⁴ .............................................. G05D 7/00
[52] U.S. Cl. .................................... 422/110; 137/578; 422/111; 422/140
[58] Field of Search ............... 422/106, 115, 110, 111, 422/140; 208/143, 146, 148; 137/578

[56] References Cited

U.S. PATENT DOCUMENTS

| 781,093 | 1/1905 | Post | 137/578 |
|---|---|---|---|
| 838,961 | 12/1906 | Diehl | 137/578 |
| 882,030 | 3/1908 | Traulsen et al. | 137/578 |
| 2,882,928 | 4/1959 | Cogliati | 137/578 |
| 3,197,288 | 7/1965 | Johanson | 422/140 |
| 4,015,629 | 4/1977 | Morgan et al. | 137/578 |
| 4,094,338 | 6/1978 | Bauer | 137/578 |
| 4,609,425 | 9/1986 | Mateika et al. | 422/106 |
| 4,684,456 | 8/1987 | Van Driesen et al. | 422/110 |
| 4,743,367 | 5/1988 | Zeilon | 261/64.1 |

*Primary Examiner*—Barry S. Richman
*Assistant Examiner*—Amalia L. Santiago
*Attorney, Agent, or Firm*—Gary J. Cunningham; William H. Magidson; Ralph C. Medhurst

[57] ABSTRACT

A floating recycle pan is provided to control the flow of the feed into and out of the downcomer even while the oil liquid level in the ebullated bed reactor is varied to provide continuous ebullation and enhance the efficiency and yield of the process.

10 Claims, 4 Drawing Sheets

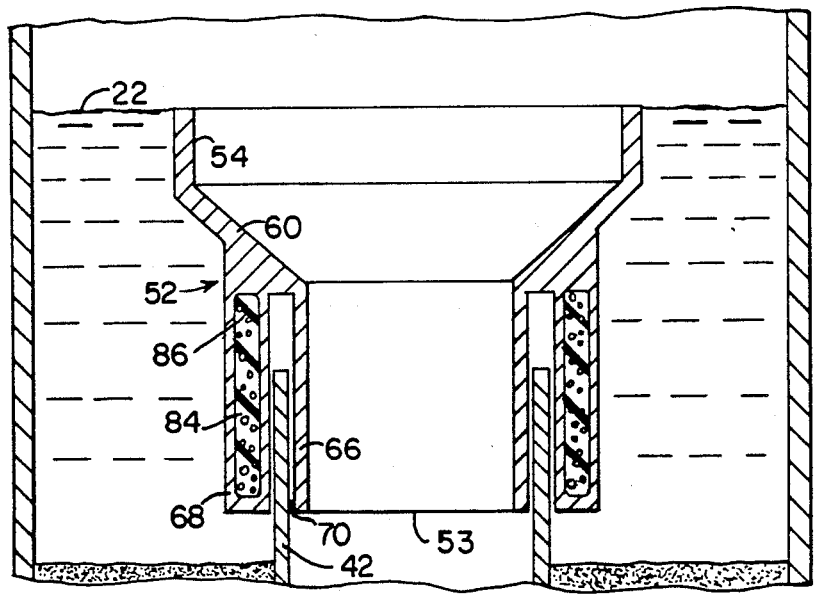

FLOATING RECYCLE PAN FOR EBULLATED BED REACTORS

This is a division, of application Ser. No. 061,533, filed June 11, 1987, now U.S. Pat. No. 4,792,391, issued Dec. 20, 1988.

BACKGROUND OF THE INVENTION

This invention relates to resid hydrotreating and, more particularly, to an improved hydrotreating process and novel ebullated bed reactor equipped with a unique floating pan.

In the past, spiraling oil costs, extensive price fluctuations, and artificial output limitations by the cartel of oil producing countries (OPEC) have created instability and uncertainty for net oil consuming countries, such as the United States, to attain adequate supplies of high-quality, low-sulfur, petroleum crude oil (sweet crude) from Saudi Arabia, Nigeria, Norway, and other countries at reasonable prices for conversion into gasoline, fuel oil, and petrochemical feedstocks. In an effort to stabilize the supply and availability of crude oil at reasonable prices, Amoco Oil Company has developed, constructed, and commercialized extensive refinery projects to process poorer quality, high-sulfur, petroleum crude oil (sour crude) and demetalate, desulfurize, and hydrocrack resid to produce high-value products, such as gasoline, distillates, catalytic cracker feed, metallurgical coke, and petrochemical feedstocks. Thus, it is to our country's benefit to provide for the availability of adequate supplies of gasoline and other petroleum products at reasonable prices.

During resid hydrotreating, resid oil (resid) is upgraded with hydrogen and a hydrotreating catalyst in a three-phase equilibrium of oil, catalyst, and gas bubbles to produce more valuable, lower-boiling liquid products. In order to increase the efficiency, effectiveness, and profitability of resid hydrotreating, it is desirable to maximize the conversion of resid to more valuable lower-boiling liquid products.

The extent of conversion of resid to more valuable lower-boiling liquid products depends in part on the residence time of the resid in the reactor.

During resid hydrotreating in ebullated bed reactors, an oil feed comprising oil and hydrogen-rich gases and fresh hydrotreating catalysts are fed and circulated in a vessel. In prior art devices, a stationary tubular downcomer with a stationary (fixed) pan extends upwardly above an ebullating pump. The ebullating pump circulates the feed upwardly in the reaction zone of the vessel, expanding the catalyst bed. The liquid level therein fluctuates above and below the stationary pan and downcomer. When the liquid level dips below the top of the stationary pan, the oil feed does not circulate through the pan, downcomer, risers, bubble caps, and the reaction zone which can cause the liquid to become stagnant and hot spots to build up in the reactor which can be dangerous. Loss of liquid circulation can cause equipment and/or catalyst damage, require shutdown of the hydrotreating unit, and/or upset downstream equipment.

It is, therefore, desirable to provide an improve hydrotreating process and reactor for increasing the conversion of resid which overcomes most, if not all, of the above problems.

SUMMARY OF THE INVENTION

An improved hydrotreating process and novel ebullated bed reactor equipped with a unique floating pan is provided which is efficient, effective, and economical. Advantageously, they improve product yield and increase the conversion of resid (resid oil) to more valuable lower-boiling liquid products such as naphtha (gasoline). They further enhance profitability by decreasing formation of carbonaceous materials (coke), downtime and frequency of repair of the unit.

The novel ebullated bed reactor has an oil feed line which feeds an oil feed comprising oil and hydrogen-rich gases into the vessel of the reactor and a fresh catalyst feed line which feeds fresh hydrotreating catalyst into the reactor. The feed is circulated in the vessel, and the catalyst bed is expanded by an ebullating pump located in the lower portion of the reactor. A tubular downcomer extends generally upwardly above the ebullated pump. Desirably, a floating tubular pan is slidably connected to the upper portion of the downcomer to facilitate the flow and circulation of the feed into the downcomer.

In the novel hydrotreating process, the hydrotreating catalyst is fed into an ebullated bed reactor. The ebullated bed reactor is partially filled to a preselected level with a feed comprising oil and hydrogen-rich gases. A tubular pan floats upon the feed generally about the liquid level and at least partially above a downcomer. The feed is then directed generally downwardly through the pan and downcomer. Concurrently, the oil and hydrogen-rich gas comprising the feed are mixed together in the presence of the catalyst to produce upgraded oil. In order to minimize coke formation in the pan, one or more purge tubes can be provided to inject gases, such as hydrogen-rich gases, about the pan.

A more detailed explanation of the invention is provided in the following description and the appended claims taken in conjunction with the accompanying drawings.

BRIEF DESCRIPTION OF THE DRAWINGS

FIG. 7 is an enlarged partial cross-sectional view of the ebullated bed reactor with a further embodiment of the floating recycle pan in accordance with principles of the present invention.

DESCRIPTION OF THE PREFERRED EMBODIMENT

Figure 1:
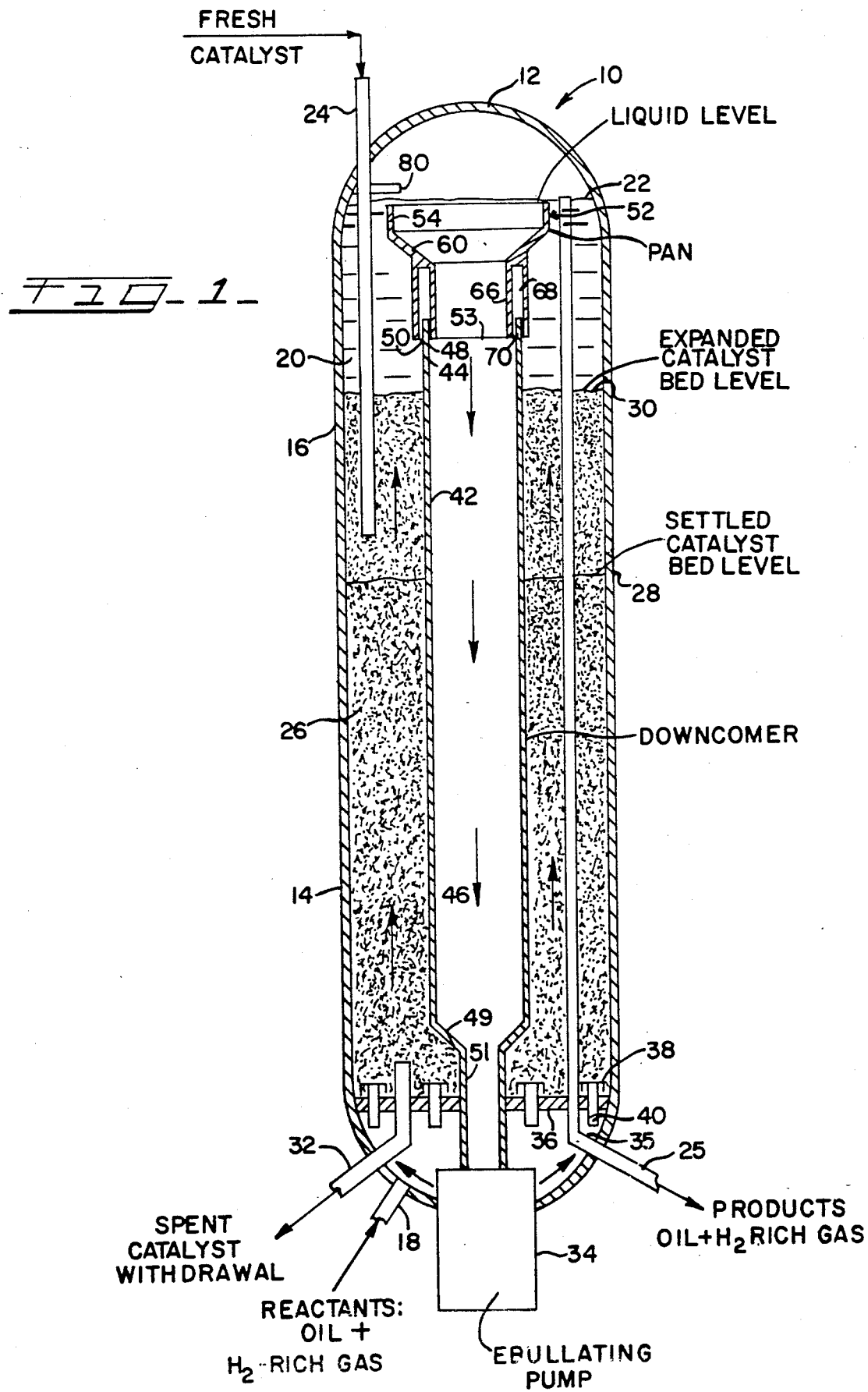
FIG. 1 is a cross-sectional view of the ebullated bed reactor equipped with a floating recycle pan in accordance with the present invention.

The ebullated bed reactor 10, as illustrated in FIG. 1, also sometimes referred to as an expanded bed reactor, includes an upright elongated vessel 12 with a lower portion 14 and an upper portion 16. An oil feed line 18, conduit or pipe, feeds an oil feed comprising resid (resid oil) and hydrogen-rich gases into the lower portion 14 of the reaction zone 20 of the vessel 12. The top surface of the feed in the reactor is referred to as the liquid level 22. A catalyst feed line, conduit or pipe 24 feeds fresh hydrotreating catalyst into the upper portion 16 of the reaction zone 20 to form a catalyst bed 26 in the vessel 12. The catalyst bed 26 is expandable from a settled bed level 28 to an expanded catalyst bed level 30. The upgraded oil produced in the reactor 10 is withdrawn through the product withdrawal line 25.

The catalyst can be carried through the feed line 24 with gas oil. A spent catalyst withdrawal line, conduit or pipe 32 withdraws spent catalyst from the lower portion 14 of the vessel 12. The oil slurried hydrotreating catalyst enhances the flexibility of the ebullated bed reactors and permits the addition or withdrawal of oil/catalyst slurry without taking the reactors offstream. Daily catalyst replacement results in a steady state equilibrium catalyst activity.

Ebullated bed reactors have many advantages over fixed bed reactors. They permit operation at higher average temperatures. They permit the addition and withdrawal of catalyst without necessitating shutdown. They avoid plugging due to dirty feed and formation of solids during resid conversion. And they may be operated at extremely high temperatures and high pressure.

Since the liquid resid feed does not usually have enough velocity to expand the catalyst bed above its settled level, liquid is recycled from the top of the reactor to the bottom of the reactor through a downcomer pipe 42 and then pumped back up through the reactor 10 at a sufficient velocity to attain the required degree of expansion.

The products produced from the resid hydrotreating units in the ebullated bed reactors include light hydrocarbon gases, light naphtha, intermediate naphtha, heavy naphtha, light distillate, mid-distillate, light gas oil, vacuum naphtha, light vacuum gas oil, heavy vacuum gas oil, and hydrotreated vacuum resid. Light and intermediate naphthas can be sent to a vapor recovery unit for use as gasoline blending stocks and reformer feed. Heavy naphtha can be sent to the reformer to produce gasoline. The mid-distillate oil is useful for producing diesel fuel and furnace oil, as well as for conveying and/or cooling the spent catalyst. Light and heavy vacuum gas oils and light gas oil are useful as feedstock for a catalytic cracker. The vacuum resid can be sent to cokers to produce coke.

An ebullating pump 34 is located in the lower portion 14 of the vessel 12, for controlling, expanding and varying the height of the catalyst bed 26 as well as for circulating and expanding the oil feed.

The lower portion 14 of the reactor includes a bottom section 35 with a horizontal distributor plate 36 which separates the reaction zone 20 from the bottom section 35 of the reactor. The distributor plate 36 has a multitude of bubble caps 38 and risers 40 which direct the flow of oil and hydrogen-rich gases upward to the reaction zone 20, while preventing flow of catalyst downward to the bottom section 35.

An elongated stationary tubular downcomer 42 extends generally upward above the ebullating pump 34. The downcomer has an upper end portion 44 and a lower end portion 46. The upper end portion 44 of the tubular downcomer 42 also has an inner surface 4 and outer surface 50. The lower end portion 46 has a flared neck 49 and reduced diameter bottom section 51.

Figure 2:
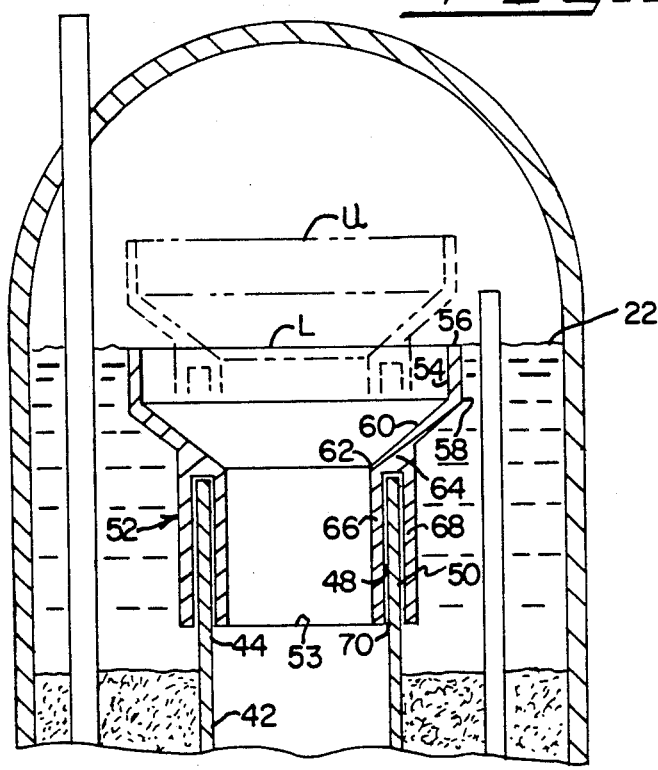
FIG. 2 is an enlarged partial cross-sectional view thereof, showing in solid line the recycle pan in a lower retracted position and in dotted line the recycle pan in an expanded upper position.

Referring to FIG. 2 a vertically movable floating annular recycle pan 52 facilitates and controls the flow of the liquid into the downcomer 42 either when the height of the liquid level 22 is varied or constant. The recycle pan 52 is fabricated out of a metal, such as aluminum or stainless steel, which resists corrosion from the oil feed, gases and products produced in the reactor and which substantially maintains its structural integrity and strength at hydrotreating conditions. The pan is designed and/or comprises a material which is lighter, less dense, and/or has a specific gravity less than the oil feed so that the pan will at least partially float about the liquid level on the oil feed contained in the ebullated bed reactor 10.

The recycle pan 52 (FIG. 2) has an inner circular feed passageway 53 and is generally funnel-shaped and has a substantially circular upright wall 54 with a top portion 56 and bottom portion 58. The middle of the pan 52 has a sloping section 60 comprising an annular inwardly sloping frustoconical flared wall extending downwardly at an angle of inclination from the bottom portion 58 of the upright wall 54. The bottom 62 of the sloping wall 60 has a shoulder 64. An inner annular neck 66 and an outer sleeve 68 or skirt extends vertically downwardly from the shoulder 64. The outer sleeve 68 is sufficiently spaced from the inner neck 66 and cooperates with the shoulder 64 to define a pocket 70 for slidably engaging the upper end portion 44 of the downcomer 42. The recycle pan 52 is telescopically movable from a lower retracted position L seated upon the upper end portion 44 of the downcomer 42, as shown in solid line in FIG. 2, to an upper expanded position U with the shoulder 64 spaced above the upper end portion 44 of the downcomer 42 when the catalyst bed 26 is expanded, as shown in dotted line FIG. 2. The inner neck 66 of the recycle pan 52 slides upon and engages the inner surface 48 of the stationary downcomer 42. Similarly, the outer sleeve 68 of the recycle pan 52 slides upon and engages the outer surface 50 of the downcomer 42. This arrangement allows vertical movement and facilitates flotation of the recycle pan 52 at least partially above the liquid level 22 of the oil feed.

Figure 4:
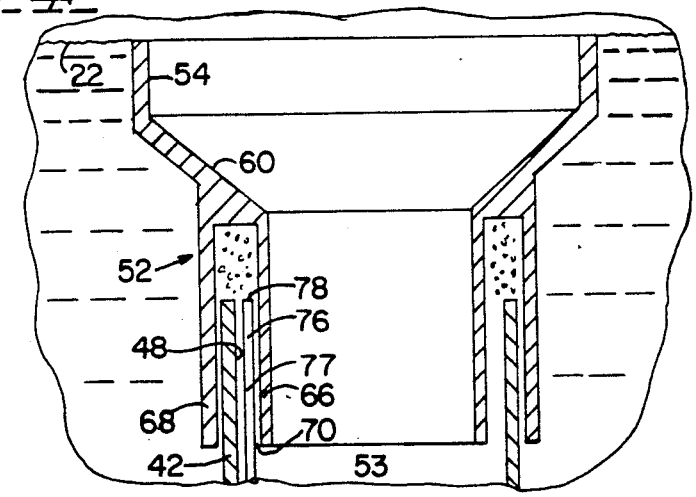
FIGS. 4-6 are enlarged partial cross-sectional views of the ebullated bed reactor with various arrangements of purge lines positioned about the recycle pan.

Referring to FIG. 4, an elongated purge line, tube or injector 76 can be used to feed hydrogen-rich gases in and about the pocket 70 between the inner neck 66 and the outer sleeve 68 to substantially minimize the accumulation of carbonaceous residue in and about pocket 70. The purge line 76 has an upper vertical portion 77 with an outlet 78 located between the inner neck 66 and the inner surface 48 of the downcomer 42.

Figure 5:
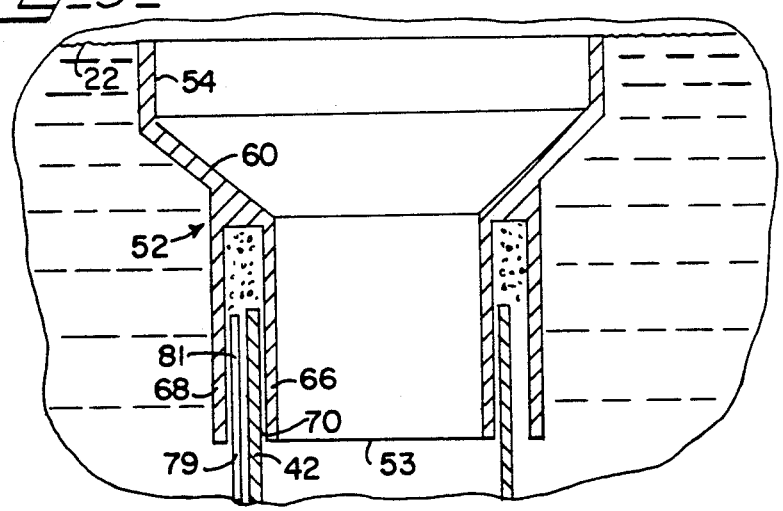

The purge line, tube or injector 79 of FIG. 5 is similar structurally and functionally to the purge line, tube or injector 76 of FIG. 4, except the upper vertical portion 81 of the purge line 79 is located between the outer sleeve 68 and the outer surface 50 of the downcomer 42.

Figure 6:
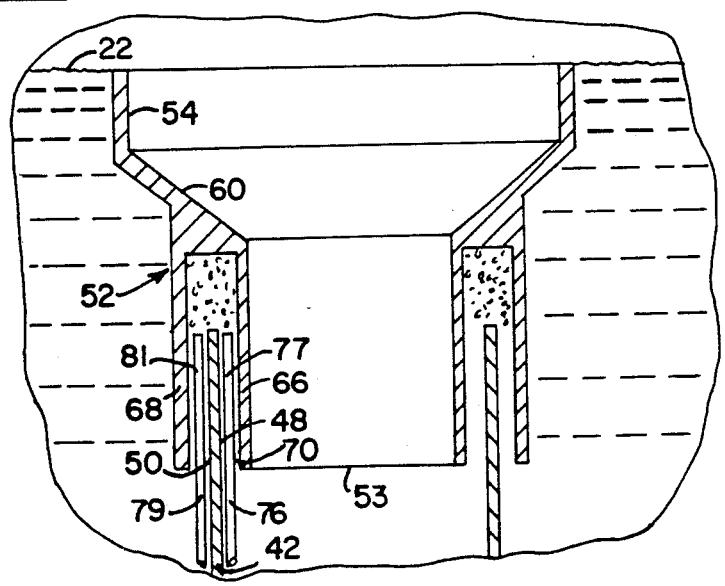

In the embodiment of FIG. 6, two similar purge lines, tubes or injectors 76 and 79 ar shown. The upper vertical portion 77 of one of the purge lines 76 is located between the inner neck 66 and the inner surface 48 of the downcomer 42. The upper vertical portion 81 of the other purge line 79 is located between the outer sleeve 68 and the outer surface 50 of the downcomer 42.

As shown in FIG. 1, the ebullated bed reactor 10 can have a horizontal bar 80 attached to the inner wall in the upper portion 14 of the vessel 12. The horizontal bar 80 is paced a fixed distance above the top edge of the upright wall 54 of the recycle pan 52 to provide a stopper or an abutment stop. The bar 80 restricts the distance the recycle pan 52 travels above the upper end portion 44 of the stationary downcomer 42 when the recycle pan 52 is in the upper expanded position U (FIG. 2) and the catalyst bed 26 and oil feed are expanded. When the recycle pan 52 is restricted by the stopper 80, the liquid level can rise substantially above the top of the recycle pan.

Figure 3:
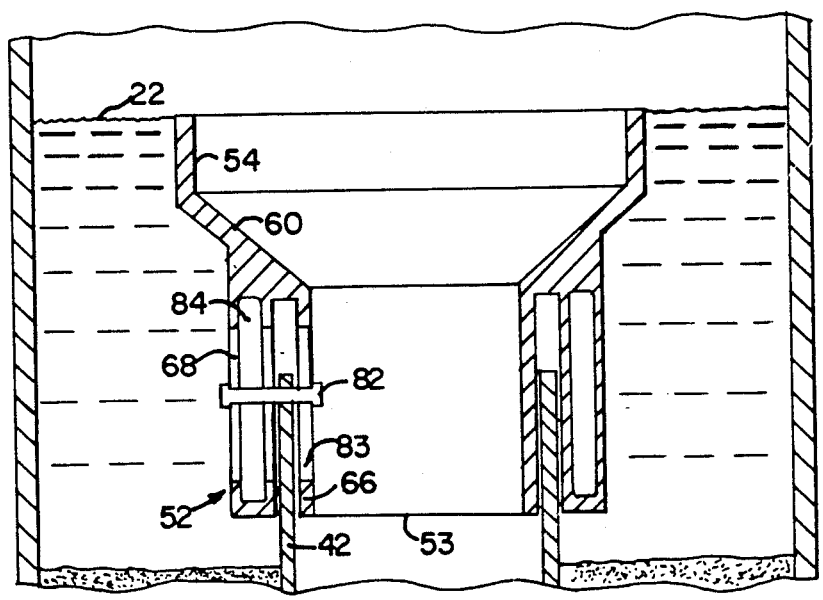
FIG. 3 is an enlarged partial cross-sectional view of the ebullated bed reactor with another embodiment of the floating recycle pan in accordance with principles of the present invention.

Alternatively, a horizontal pin or bolt 82, as illustrated in FIG. 3, can be attached through a slotted portion 83 of the inner neck 66 and outer sleeve 68 of the recycle pan 52 and the upper end portion 44 of the downcomer to provide a stopper or abutment stop. The pin can be held in place at both ends by nuts, c-clamps or other fasteners. The stopper of FIG. 3 serves the same function as the stopper of FIG. 1 and the reactor operates in a similar manner.

As illustrated in FIG. 3, the floating recycle pan 52 can have an arcuate chamber 84 which provides a fluid pocket or annular cavity in the outer sleeve 68. The arcuate chamber is spaced radially outwardly of the pocket 70 and is preferably circular. If desired, the chamber 84 can comprise one or more arcuate segments. The arcuate chamber 84 may be filled with a fluid, such as an inert gas comprising nitrogen, hydrogen, and light hydrocarbon gases (methane, ethane, etc.). The fluid can also comprise light oils. In order to enhance the flotation and buoyancy of the recycle pan 52, the fluid injected and contained in the chamber 84 is lighter, less dense and has a lower specific gravity than the oil feed in the ebullated bed reactor 10.

The embodiment of FIG. 7 is similar structurally and functionally to the embodiment of FIG. 3, except that the chamber 84 contains a solid flotation material 86 which is lighter, less dense and has a lower specific gravity than the oil feed in the ebullated bed reactor in order to enhance the flotation and buoyancy and specific gravity of the floating recycle pan 52. Preferably, the solid material in the chamber 84 of FIG. 7 provides a flotation device. The flotation device enhances the stability, rigidity, strength, buoyancy and flotation of the floating recycle pan 52. If desired, the solid or composite material can comprise carbon composites, graphite, coke (carbonaceous material) light metal alloys, ceramics and/or plastics. Other materials can also be used. The solid or composite material can also be used with the fluids previously described in the embodiment of FIG. 3 and/or can be reinforced with metal.

In order to use the hydrotreating process equipped with the novel floating pan 52 (FIG. 1), a hydrotreating catalyst is fed through the catalyst feed line 24 into the reaction zone 20 of the ebullated bed reactor 10 to form a catalyst bed 26. Then, the ebullated bed reactor 10 is substantially filled to a preselected height with a liquid level 22 below the top of the vessel 12. This is accomplished by feeding an oil and gas feed comprising resid oil and hydrogen-rich gases to the vessel 12 through the feed line 18. The resid oil can be diluted with gas oil or other diluents.

Thereafter, the oil and hydrogen-rich gases from the oil feed line 18 (FIG. 1) are ebullated, mixed and reacted in the reactor 10 with each other together with and in the presence of the hydrotreating catalyst, from the fresh catalyst feed line 24, under hydrotreating condition to produce upgraded oil. Typical hydrotreating conditions include: a hydrotreating temperature ranging from about 700° F. to about 850° F., a hydrotreating total pressure ranging from about 2,550 psia to about 3,050 psia, a hydrogen partial pressure ranging from about 1,600 psia to about 2,300 psia, and a liquid hourly space velocity (LHSV) from about 0.15 to about 0.7 $hr^{-1}$.

During hydrotreating, the liquid level 22 (FIG. 1) of the oil feed is expanded an varied in the vessel 12 while, simultaneously, the height of the catalyst bed 26 is expanded.

At least an upper portion of the generally funnel-shaped annular recycle pan 52 telescopically slides and floats, about the liquid level 22, along the upper end portion 44 of the elongated stationary (fixed) upright downcomer 42 so that the top or upper edge of the upright wall 54 of the recycle pan 52 is positioned slightly below the liquid level 22 to receive the oil and gas feed.

Concurrently, the oil and gas feed is circulated, directed and passed, generally downwardly, through the central circular passageway 53 (FIG. 1) of the floating recycle pan 52 through the stationary downcomer 42 in the vessel 12 by the ebullating pump 34. The oil and gas feed in the bottom section 35 of the vessel 12, in proximity to the ebullating pump 34, is circulated upwardly through the distributor plate 36 by way of a multiplicity of bubblecaps 38 and risers 40 which help to evenly distribute the oil and the gas across the reaction zone 20. The upgraded oil from the ebullated bed reactor 10 is withdrawn through the product withdrawal line 25.

Purge gases, such as hydrogen-rich gases, can be injected through at least one purge line 76 and/or 79 into or in proximity of the pocket 70 of the recycle pan 52, as seen in FIGS. 4, 5 and 6, to substantially minimize the accumulation of carbonaceous residue or coke therein so that the recycle pan 52 will not bond, stick or adhere to the downcomer 42 and be prevented from sliding and floating.

Although embodiments of this invention have been shown and described, it is to be understood that various modifications and substitutions, as well as rearrangements and combinations of process steps and equipment, can be made by those skilled in the art without departing from the novel spirit and scope of this invention.

What is claimed is:

1. An ebullated bed reactor, comprising:
  a substantially enclosed vessel having a lower portion and an upper portion for processing oil;
  oil feed means connected to said vessel for feeding an oil feed comprising oil and hydrogen-rich gases into said lower portion of said vessel;
  fresh catalyst feed means connected to said vessel for feeding fresh hydrotreating catalyst into said vessel;
  ebullating pump means located in the lower portion of said vessel for circulating said oil feed in said vessel in the presence of said catalyst to hydrotreat said oil;
  a tubular downcomer extending generally upward above said pump means, said downcomer having an upper end and, a lower end in proximity to said pump means, and an inner surface and an outer surface; and
  a floating tubular recycle pan slidably connected to said upper end of said downcomer in said upper portion of said vessel for facilitating flow of said oil feed into said downcomer, said floating tubular pan having a substantially circular upright wall with a top portion and a bottom portion, said pan having an annular inwardly sloping frustoconical flared wall extending downwardly at an angle of inclination from said bottom portion of said upright wall, said sloping wall having a bottom with a shoulder, said floating tubular pan having an inner annular neck extending substantially downwardly from said shoulder for slidably engaging said inner surface of said downcomer and an outer sleeve extending substantially downwardly from said shoulder for slidably engaging said outer surface of said downcomer, and said outer sleeve being spaced from said inner neck and cooperating with said shoulder to define a pocket therebetween comprising an annular compartment for slidably receiving the upper end of said downcomer.

2. An ebullated bed reactor in accordance with claim 1 further including limiting means providing a stopper comprising a fastener selected from the group consisting of a substantially horizontal pin and bolt attached to said upper portion of said downcomer and extending through said inner annular neck and said outer sleeve of said pan for restricting the distance said pan travels above said upper portion of said downcomer when said catalyst bed is expanded.

3. An ebullated bed reactor, comprising:
a vessel having a lower portion and an upper portion;
oil feed means connected to said vessel for feeding an oil feed comprising resid oil and hydrogen-rich gases into said vessel;
fresh catalyst feed means connected to said vessel for feeding fresh hydrotreating catalysts into said vessel to form a catalyst bed in said vessel;
ebullating pump means located in the lower portion of said vessel for controlling and varying the height of said oil feed in said vessel;
a stationary tubular downcomer extending generally upward above said pump means, said downcomer having an inner surface, an outer surface, an upper portion and a lower portion in proximity to said pump means, and
a moveable annular recycle pan operatively associated with said upper end of said downcomer in said upper portion of said vessel for facilitating and controlling the flow of said oil feed into and out of said downcomer during said varying height of said oil feed in said vessel and when said height of said oil feed is kept relatively uniform, said moveable recycle pan having a shoulder and being telescopically moveable from a lower retracted position seating upon said upper portion of said downcomer to an upper position with said shoulder spaced above said upper portion of said downcomer when said catalyst bed is expanded, said pan including an inner neck for slidably engaging said inner surface of said downcomer and an outer sleeve for slidably engaging said outer surface of said downcomer extending substantially downwardly from said shoulder, and said outer sleeve being spaced from said inner neck and cooperating with said shoulder to define a pocket therebetween; and
a purge line comprising an injector for feeding hydrogen-rich gases to said pocket between said inner neck and said outer sleeve to substantially minimize accumulation of carbonaceous residue in said pocket, said purge line having an upper substantially vertical portion with an outlet located between said inner neck and an upper portion of said downcomer.

4. An ebullated bed reactor in accordance with claim 3 wherein said pocket comprises an annular compartment for slidably receiving the upper end of said downcomer.

5. An ebullated bed reactor in accordance with claim 3 wherein said at least one tube is located between said neck and said downcomer.

6. An ebullated bed reactor in accordance with claim 3 wherein said at least one tube is located between said sleeve and said downcomer.

7. An ebullated bed reactor in accordance with claim 3 wherein said purge means comprises a first tube located between said neck and said downcomer and a second tube located between said sleeve and said downcomer.

8. An ebullated bed reactor, comprising:
an upright elongated vessel having a lower portion and an upper portion;
oil feed means connected to said vessel for feeding an oil feed comprising resid oil and hydrogen-rich gases into the lower portion of said vessel;
fresh catalyst feed means connected to said vessel for feeding fresh hydrotreating catalyst into said vessel to form a catalyst bed in said vessel;
ebullating pump means located in the lower portion of said vessel for controlling, expanding and varying the height of said oil feed and said catalyst bed in said vessel;
an elongated stationary tubular downcomer extending generally upward above said pump means, said downcomer having an upper portion with an inner surface and an outer surface;
a vertically movable, floating annular recycle pan, said pan being generally funnel-shaped and having a substantially circular upright wall with a top portion and bottom portion, said pan having an annular inwardly sloping wall extending downwardly at an angle of inclination from said bottom portion of said upright wall, said sloping wall having a bottom with a shoulder, said pan having an inner annular neck and an outer sleeve extending substantially vertically downwardly from said shoulder, said outer sleeve being spaced from said inner annular neck and cooperating with said shoulder to define therebetween a pocket for slidably engaging said upper portion of said downcomer, said pan being telescopically moveable from a lower retracted position seating upon said upper portion of said downcomer to an expanded upper position with said shoulder spaced above said upper portion of said downcomer when said catalyst bed is expanded, said inner annular neck being slidably engageable with said inner surface of said downcomer, and said outer sleeve being slidably engageable with said outer surface of said downcomer, and said recycle pan includes flotation means for enhancing the flotation of said pan, said flotation means having at least one arcuate chamber defining a cavity spaced radially outwardly of said pocket.

9. An ebullated bed reactor in accordance with claim 8 wherein said arcuate chamber is capable of containing a material substantially less dense than said oil feed.

10. An ebullated bed reactor in accordance with claim 8 wherein said flotation means is capable of containing a material selected from the group consisting of nitrogen, hydrogen, light hydrocarbon gases, light oil, coke, carbon composite, graphite, light metal alloy, ceramic, plastic, and combinations thereof.

* * * * *